US008389614B2

(12) United States Patent
Scheer et al.

(10) Patent No.: US 8,389,614 B2
(45) Date of Patent: *Mar. 5, 2013

(54) BIODEGRADABLE NANOPOLYMER COMPOSITIONS AND BIODEGRADABLE ARTICLES MADE THEREOF

(75) Inventors: Frederic Scheer, Hawthorne, CA (US); William E. Kelly, Hawthorne, CA (US)

(73) Assignee: Cereplast, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,178

(22) Filed: May 9, 2011

(65) Prior Publication Data

US 2011/0269890 A1 Nov. 3, 2011

Related U.S. Application Data

(63) Continuation of application No. 11/953,547, filed on Dec. 10, 2007, now abandoned, which is a continuation-in-part of application No. 11/365,579, filed on Feb. 28, 2006, now Pat. No. 7,927,532.

(51) Int. Cl.
C08L 67/04 (2006.01)
C08K 3/34 (2006.01)
C08K 9/06 (2006.01)
(52) U.S. Cl. .................. 524/445; 524/493; 524/539
(58) Field of Classification Search .......... 524/445, 524/493, 539
See application file for complete search history.

(56) References Cited

U.S. PATENT DOCUMENTS

| | | | |
|---|---|---|---|
| 2,012,267 A | 8/1935 | Carothers | |
| 6,020,393 A | 2/2000 | Khemani | |
| 6,136,905 A | 10/2000 | Suzuki et al. | |
| 6,869,985 B2 * | 3/2005 | Mohanty et al. | 523/124 |
| 7,138,439 B2 * | 11/2006 | Scheer et al. | 523/100 |
| 7,393,590 B2 * | 7/2008 | Scheer et al. | 428/480 |
| 2005/0043462 A1 * | 2/2005 | Yamada et al. | 524/445 |
| 2005/0112363 A1 | 5/2005 | Ning | |
| 2005/0192377 A1 | 9/2005 | Scheer et al. | |
| 2008/0113887 A1 | 5/2008 | Scheer et al. | |
| 2008/0153940 A1 | 6/2008 | Scheer | |
| 2009/0162630 A1 | 6/2009 | Shin | |
| 2011/0229669 A1 | 9/2011 | Scheer | |

FOREIGN PATENT DOCUMENTS

EP  1561785  * 8/2005

* cited by examiner

*Primary Examiner* — Ana Woodward
(74) *Attorney, Agent, or Firm* — Wolf, Greenfield & Sacks, P.C.

(57) ABSTRACT

Biodegradable nanopolymer compositions and methods of making the compositions are provided. In a general embodiment, the present disclosure provides a biodegradable nanopolymer composition made from starting material comprising poly(lactic acid), co-polyester polymer with adipic acid compounded and nanoparticles of a mineral material such as silica and magnesium silicate. In addition, the present disclosure provides processes for making the biodegradable nanopolymer compositions as well as biodegradable articles made using the biodegradable nanopolymer compositions such as molded, formed and extruded articles.

6 Claims, No Drawings

BIODEGRADABLE NANOPOLYMER COMPOSITIONS AND BIODEGRADABLE ARTICLES MADE THEREOF

PRIORITY CLAIM

This application is a continuation of U.S. patent application Ser. No. 11/953,547, filed Dec. 10, 2007, which is a continuation-in-part application of U.S. patent application Ser. No. 11/365,579 filed on Feb. 28, 2006, the entire contents both of which are expressly incorporated herein by reference.

BACKGROUND

The present disclosure relates to polymer compositions. More specifically, the present disclosure relates to biodegradable nanopolymer compositions, methods for making and using the biodegradable nanopolymer compositions and biodegradable articles made from the polymer compositions.

Packaging material and disposable beakers, cups and cutlery are used widely nowadays and allow food material to be sold and/or consumed under hygienic conditions. Such disposable materials and objects are highly desired by consumers and retailers because they may be simply disposed of after use and do not have to be washed and cleaned like conventional dishes, glasses or cutlery.

Unfortunately, the widespread and growing use of such disposable materials results in a mounting amount of litter produced each day. Currently, the plastic waste is either provided to garbage incinerators or accumulates in refuse dumps. These methods of waste disposal cause many problems for the environment.

SUMMARY

The present disclosure is directed to biodegradable nanopolymer compositions, methods for making and using the biodegradable nanopolymer compositions and biodegradable articles made from the biodegradable nanopolymer compositions. In a general embodiment, the present disclosure provides a polymer composition made from starting materials comprising between about 20% and about 97% by weight of poly(lactic acid) polymer (PLA), between about 0.5% and about 65% by weight of a co-polyester polymer with adipic acid, nanoparticles of a mineral material selected from the group consisting of silica, nanoclays of the vermiculite family, magnesium silicate and combinations thereof, and organic peroxide. The percentage of each material is given based on the total weight of the polymer composition.

In an embodiment, the nanoparticles comprise between about 0.01% and about 6% by weight on the basis of the total weight of the polymer composition.

In an embodiment, the organic peroxide comprises between about 0.01% and about 5% by weight on the basis of the total weight of the polymer composition.

In an embodiment, the nanoparticles of the mineral material have a size ranging between about 20 and about 500 nanometers.

In an embodiment, the nanoparticles of the mineral material have a degree of purity of at least 99.9%.

In an embodiment, the degree of purity is 99.99%.

In an embodiment, the biodegradable nanopolymer composition comprises between about 5% and about 35% of calcium sulfate.

In an embodiment, the biodegradable nanopolymer composition comprises organically coated calcium carbonate.

In an embodiment, the biodegradable nanopolymer composition comprises an oligomeric chain extender.

In an embodiment, the biodegradable nanopolymer composition comprises between about 1% and about 32% of particles of a mineral filler selected from the group consisting of magnesium silicate, talc and combinations thereof. The mineral filler can have a particle size ranging between about 0.2 and about 4.0 microns.

In an embodiment, the organic peroxide is selected from the group consisting of diacetyl peroxide, cumyl-hydro-peroxide, dibenzoyl peroxide, dialkyl peroxide, 2,5-methyl-2,5-di(terbutylperoxy)-hexane and combinations thereof.

In an embodiment, the co-polyester polymer is selected from the group consisting of polyester, co-polyester and combinations thereof.

In another embodiment, the present disclosure provides a molded, extruded or thermoformed article comprising a biodegradable nanopolymer composition made from starting materials comprising between about 20% and about 97% by weight of poly(lactic acid) polymer, between about 0.5% and about 65% by weight of co-polyester polymer with adipic acid, between about 0.01% and about 6% by weight of nanoparticles of a mineral material selected from the group consisting of silica and magnesium silicate and combinations thereof, and between about 0.01% and about 5% by weight of organic peroxide, each on the basis of the total weight of the biodegradable nanopolymer composition.

In an embodiment, the article is selected from the group consisting of utensils, food service-ware, forks, spoons, knives, chopsticks, containers, cups, plates, pots and combinations thereof.

In an alternative embodiment, the present disclosure provides a method of producing an article comprising a biodegradable nanopolymer composition. The method comprises (i) providing between about 20% and about 97% by weight of poly(lactic acid) polymer, between about 0.5% and about 65% by weight of co-polyester polymer with adipic acid, between about 0.01% and about 6% by weight of nanoparticles of a mineral material selected from the group consisting of silica and magnesium silicate and combinations thereof, and between about 0.01% and about 5% by weight of organic peroxide, each on the basis of the total weight of the biodegradable nanopolymer composition; (ii) mixing the constituents of (i) so as to prevent the creation of aggregates; (iii) heating the mixture to a temperature ranging from about 95° C. to about 135° C.; and (iv) forming the heated mixture to obtain a desired shape of the article.

In an embodiment, the nanoparticles of the mineral material are indirectly introduced into a barrel of a mixer/extruder.

In an embodiment, the nanoparticles of the mineral material are introduced into a barrel of a mixer/extruder through a side feeder.

In an embodiment, forming the heated mixture includes subjecting the biodegradable nanopolymer composition to a process selected from the group consisting of injection molding, profile extrusion, thermoform extrusion and combinations thereof.

An advantage of the present disclosure is to provide an improved biodegradable nanopolymer composition.

Another advantage of the present disclosure is to provide a biodegradable nanopolymer composition that exhibits improved mechanical performance.

Yet another advantage of the present disclosure is to provide a biodegradable nanopolymer composition that exhibits improved thermal performance.

Still another advantage of the present disclosure is to provide an improved method of making a biodegradable nanopolymer composition.

Additional features and advantages are described herein, and will be apparent from, the following Detailed Description.

DETAILED DESCRIPTION

The present disclosure is directed to biodegradable nanopolymer compositions, methods for making and using the biodegradable nanopolymer compositions and biodegradable articles made from the biodegradable nanopolymer compositions. Biodegradation can refer to a degradation process resulting from the action of naturally occurring microorganisms such as bacteria, fungi and algae. For example, biodegradable polymers can be comprised of components that are reduced in film or fiber strength by microbial catalyzed degradation. The biodegradable polymers are reduced to monomers or short chains, which are then assimilated by the microbes. In an aerobic environment, these monomers or short chains are ultimately oxidized to $CO_2$, $H_2O$, and new cell biomass. In an anaerobic environment the monomers or short chains are ultimately oxidized to $CO_2$, $H_2O$, acetate, methane, and cell biomass.

Successful biodegradation requires direct physical contact between the biodegradable polymers and the active microbial population or the enzymes produced by the active microbial population. Moreover, certain minimal physical and chemical requirements such as suitable pH, temperature, oxygen concentration, proper nutrients, and moisture level should be met (cf. U.S. Pat. No. 6,020,393).

Generally, a degradable composition is designed to undergo a significant change in its chemical structure under specific environmental conditions, resulting in a loss of some properties that may be measured by standard tests methods appropriate to the plastic and the application in a period of time that determines its classification. Depending on the additional components present in the composition and the dimensions of the object made from the degradable material, the time period required for degradation will vary and may also be controlled when desired. The time span for biodegradation is usually significantly shorter than the time span required for a degradation of objects made from conventional plastic materials having the same dimensions, such as e.g. polyethylene, which have been designed to last for as long as possible. For example, cellulose and Kraft paper can biodegrade within 83 days in a compost environment.

Biodegradable nanopolymer compositions of the present disclosure can be biodegradable when exposed to specific environmental conditions such as composting, which will result in a loss of some properties that may be measured by standard methods appropriate to the plastic and in the application in a period of time that determines its classification. For instance, composting is a managed process that controls the biological decomposition and transformation of biodegradable materials into humus-like substance called compost: the aerobic mesophilic and thermophilic degradation of organic matter to make compost; the transformation of biologically decomposable material through a controlled process of biooxidation that proceed through mesophilic and thermophilic phases and results in the production of carbon dioxide, water, minerals, and stabilized organic matter (compost or humus) (ASTM Terminology). Consequently, main components of the biodegradable nanopolymer composition of the present disclosure such as poly(lactic acid) and co-polyester polymer with adipic acid will be degraded to small organic fragments which will create stabilized organic matter and will not introduce any hazard or heavy metals into soil.

In an embodiment, the biodegradable nanopolymer compositions of the present disclosure biodegrade in a shorter period of time and will pass the tests required by ASTM 6400 D99, which demand that compostable plastic biodegrades within less than 180 days. Articles made from polyethylene do not degrade under normal composting conditions, and PLA-based articles take weeks to degrade in compost environments (about 6 to 8 weeks).

Articles made from the biodegradable nanopolymer composition in embodiments of the present disclosure will not contribute to a further increase of refuse dumps; on the contrary will allow creation of organic fertilizers such as compost, while such objects simultaneously provide all advantages of disposable objects highly estimated by the consumers and producer. Articles made of the biodegradable nanopolymer composition according to the present disclosure may be disposed after use, are essentially of lightweight, and do not need to be transported to a location where they have to be cleaned. In particular, articles made from a biodegradable nanopolymer composition according to the present disclosure provide the advantage that articles thrown away in parks or at the beach will degrade and will vanish after some time. However, this disclosure should not be publicize as a license to litter the environment.

In a general embodiment, the biodegradable nanopolymer compositions are made from starting materials of poly(lactic acid) polymer (PLA), a polyester polymer with adipic acid, nanoparticles of a mineral material selected from the group consisting of silica, nanoclays of the vermiculite family, and magnesium silicate, and organic peroxide. Biodegradable nanopolymer compositions according to the present disclosure may be produced by completely or partially from renewable sources when desired. In addition, biodegradable nanopolymer compositions according to the present disclosure may be adapted to various processing methods known in the art.

Poly(lactic acid) may be represented by the following structure:

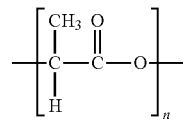

wherein n for example can be an integer between 10 and 250. Poly(lactic acid) can be prepared according to any method known in the state of the art. For example, poly(lactic acid) can be prepared from lactic acid and/or from one or more of D-lactide (i.e. a dilactone, or a cyclic dimer of D-lactic acid), L-lactide (i.e. a dilactone, or a cyclic dimer of L-lactic acid), meso D,L-lactide (i.e. a cyclic dimer of D-, and L-lactic acid), and racemic D,L-lactide (racemic D,L-lactide comprises a 1/1 mixture of D-, and L-lactide).

Polylactides (PLAs) resemble clear polystyrene and have good gloss and clarity for aesthetic appeal, along with physical properties well suited for use as fibers, films, and thermoformed packaging. PLA is biocompatible and has been used extensively in medical and surgical applications, e.g. sutures and drug delivery devices. Unfortunately, PLA present major weaknesses such as brittleness as well as low thermal resistance, 136° F. (58° Celsius) and moisture-related degradation, limiting a lot of commercial applications.

It has been surprisingly found that the biodegradable nanopolymer compositions according to the present disclosure provide physical properties that are not inherent to poly(lactic acid) and provide significant improvements with respect to the processability, production costs or heat resistance along with improved flexibility and ductility without decreasing their biodegradability.

It is assumed that the combination of a blending step performed at ambient temperature followed by extrusion at relatively high temperature and pressure through e.g. a twin screw extruder provides, in part, the creation of brand new shapes, structures or morphologies of the polymer. Extrusion of the blended polymer mass compounded with the selected mineral nanoparticles at a high temperature induces shear forces that promote an exfoliation and dispersion of the components. As a result, the new polymer composition can be constructed by evenly dispersing the selected mineral material into nanoparticles that form platelets.

The dispersion of the platelets is important to make the compositions improved, and the inventor has especially worked on avoiding the creation of aggregate of platelets, which would prevent the improvement in the properties herein described. This can be been achieved according to the present disclosure by making use for mixing the mineral nanoparticles of a custom designed side feeder, e.g. a tower to enter the barrel of the extruder. Direct injection of the nanoparticles to the molten polymer material can be avoided, which allows the necessary good and smooth distribution of the platelets during mixing and extrusion. As a result, these platelets are evenly distributed throughout the polymer matrix to create multiple parallel layers typical of the new polymer morphology discuss previously. To facilitate and to ensure a homogeneous dispersion of the platelets, the nanomaterial can eventually be dispersed using a liquid such as, for example, soybean oil or glycerin as a matrix. In a high speed blender with a controlled environment, nanoclays can be blended with the liquid matrix in an amount up to 0.25% by weight of the overall composition.

It has been further noted that not only the size, namely the average size of the nanoparticles is important, but that the degree of purity of the selected mineral material is significant to achieve the desired new features. For example, the purity of the selected mineral material can have a degree of purity of at least 99.9% and preferably a degree of purity of at least 99.99%.

The physical and thermal properties of the new polymer nanocomposites are so altered as compared to standard polymer material that the inventor retains that there is creation of a brand new material to be called "biodegradable nanopolymer composition." The new shape, structure or morphology that characterizes the biodegradable nano-polymer compositions of the disclosure tremendously and surprisingly improves the physical properties of the composition, namely its thermal properties and thermal stability (e.g., such compositions exhibit a significant improvement in terms of thermal resistance of the magnitude of 35 to 45° F. (about 1.7 to 7.2° C.) depending on specific formulations).

Because of their unique properties, the biodegradable nanopolymer compositions of the present disclosure can be formed into biodegradable articles or items that can be degraded in a natural environment in a time period that is significantly shorter as compared to the time period required for the degradation of conventional plastic materials, such as e.g. polyethylene. In a controlled environment such as a composting site, the compositions can allow biodegradation in period of time not to exceed 180 days, one of the time requirements set by the US specification set by ASTM (ASTM 6400 D99). Moreover, the biodegradable nanopolymer compositions can made into various articles such as bags, bottles or cutlery exhibiting desired properties for the respective purpose.

In another embodiment, the biodegradable nanopolymer composition are made from starting materials comprising between about 20% by weight to 97% by weight of poly(lactic acid) polymer, between about 0.5% by weight to 65% by weight of co-polyester polymer with adipic acid between about 0.01% and about 6% by weight of nanoparticles of a mineral material selected from the group consisting of silica, magnesium silicate and combinations thereof, and between about 0.01% and about 5% by weight of organic peroxide, each on the basis of the total weight of the biodegradable nanopolymer composition.

The incorporation of the nanoparticles or nano-sized fillers, whether they are minerals or organic fibers, creates the foundation of polymer nanocomposites. The benefits of nanocomposites extend well beyond one or two improvements but translate into several improvements of physical and thermal properties of polymers at such degree that the starting core polymer matrix composition is modified into new shapes or structures, which allow eventually the creation of completely novel material or features.

In an embodiment, the biodegradable nanopolymer composition can be made by mixing or blending the respective constituents in the desired amounts. This may be performed according to any method known in by the skilled artisan. For example, poly(lactic acid) polymer and co-polyester polymer with adipic acid may be mixed in pure form, for example blended by means of mill roll blending, and heated to a temperature chosen according to the general knowledge in the art such that at least one of the above-mentioned components is partially or essentially completely molten.

The preparation of polyesters and copolyesters is well known in the art, such as disclosed in U.S. Pat. No. 2,012,267, which is incorporated herein by reference. Such reactions are typically operated at temperatures from 150° C. to 300° C. in the presence of polycondensation catalysts such as titanium isopropoxide, manganese diacetate, antimony oxide, dibutyl tin diacetate, zinc chloride, or combinations thereof. The catalysts are typically employed in amounts between 10 to 1000 parts per million (ppm), based on total weight of the reactants (cf. U.S. Pat. No. 6,020,393).

In addition to the poly(lactic acid) and the copolyester of adipic acid, the composition is compounded with nanoparticles of a mineral material selected from the group of silica and magnesium silicate. Nanoparticles according to the disclosure define particles having a size definitely lower than the common size of current ground mineral equivalents that are usually of the order of several microns. According to an embodiment of the present disclosure, the nanoparticles have an average size ranging between about 20 and a maximum of 500 nanometers. In another embodiment, good performance can be achieved with a nanoparticle mineral having an average particle size ranging between about 200 to about 400 nanometers, e.g. about 250 nanometers.

Although size particle is an important parameter to achieve the desired performance, the extremely high degree of purity of the nanoparticle mineral selected is significant. Best results are achieved by using nanoparticles of at least 99.9%, preferably 99.99% pure silica or magnesium silicate. Special qualities of finely ground silica as provided by the specialized trade have proved suitable within the framework of the present disclosure.

The biodegradable polymer can further comprise between 1 and 32% by weight of mineral particles, each on the basis of the total weight of the biodegradable nanopolymer composition. For example, the mineral particles can comprise magnesium and/or silicate. Examples for such minerals are e.g. montmorillonite or talc. The minerals act as filler adds strength and impart stiffness. In an embodiment, the mineral particles have a size of 0.2 to 4.0 microns. In another embodiment, the mineral particles have a size of 1 to 2 microns.

Moreover, during the preparation of a biodegradable polymer according to the present disclosure organic peroxide may be added to the reaction mixture in an amount between about 0.01% and about 5% by weight, on the basis of the total weight of the biodegradable final polymer composition. Examples for organic peroxides which may be used for preparing a composition according to the present disclosure are e.g. diacetyl peroxide, cumyl-hydroperoxide, and dibenzoyl peroxide. Other organic peroxides known to a skilled person may be used as well. The organic peroxides serve as radical starter molecules initiating a polymerization and help to provide connections, in particular covalent bonds, between the components present in a composition according to the present disclosure.

In another embodiment, the biodegradable nanopolymer compositions can comprise a calcium sulfate. For example, the addition of calcium sulfate to the formulations increases the heat deflection temperature. A preferred calcium sulfate is commercially sold as US GYPSUM® calcium sulfate.

In an alternative embodiment, the biodegradable nanopolymer compositions can comprise an organically coated calcium carbonate. It has been surprising discovered that adding organically coated calcium carbonate (e.g. commercially available as EMforce® Bio) to formulations of PLA and copolyester polymers with adipic acid (e.g. ECOFLEX® from BASF) improves their impact properties substantially.

The EMforce® Bio organically coated calcium carbonate is supplied by Specialty Minerals, Inc. It is high aspect ratio calcium carbonate that has elongated morphology. It is characterized by a major axis of 1.08 microns, a minor axis of 0.25 microns and an average aspect ratio of 5.4 with the organic coating. The organically coated calcium carbonate enhances the crystallization behavior of PLA both from the melt and the glass state.

In still another embodiment, the addition of oligomeric chain extenders to the biodegradable nanopolymer compositions has also been found to be particularly useful for extrusion coating applications. For example, a preferred oligomeric chain extender comprises styrene-acrylic copolymers or oligomers containing glycidyl groups incorporated as side chains. Several useful examples are described in the International Patent Application WO 03/066704 A1 assigned to Johnson Polymer, LLC, which incorporated herein by reference. These materials are based on oligomers with styrene and acrylate building blocks that have desirable glycidyl groups incorporated as side chains. A high number of epoxy groups per oligomer chain is desired, at least about 10, preferably greater than about 15, and more preferably greater than about 20. These polymeric materials generally have a molecular weight greater than about 3000, preferably greater than about 4000, and more preferably greater than about 6000. These are commercially available from Johnson Polymer, LLC under the JONCRYL® trade name such as JONCRYL® ADR 4368. Another additive from Arkema Inc, Biostrength™ 700 can also enhance melt strength of the materials of the present disclosure. Biostrenth™ 700 is an acrylic based copolymer.

These agents can provide significant branching into the biodegradable nanopolymer composition. These agents are not monomers in the biodegradable nanopolymer composition synthesis but rather link one end of a biodegradable polymeric composition strand to an end of a second biodegradable nanopolymer composition strand. The process of accomplishing this result can be through the reaction of an already synthesized biodegradable polymeric composition, for example, in a melt with the noted agent. Catalysts can be employed if needed and/or desired. The reaction can occur in any convenient reactor or an extruder during the compounding of the biodegradable nanopolymer composition.

Depending on the specific applications desired, the biodegradable nanopolymer composition of the present disclosure may also comprise additional additives or components well known in the art, namely biodegradable components or additives such as e.g. natural coloring agents and/or additional polymeric compounds like starch, processed starch, cellulose, cellulose fibers, proteins, protein fibers, etc. The starch can be made from any suitable source such as corn, tapioca, maize, wheat, rice or combination thereof. The starch can be in any suitable form such as, for example, a powder.

In alternative embodiments, the biodegradable nanopolymer compositions of the present disclosure can comprise formulations that are modified with plasticizers, flow promoters, polymer processing aids, slip agents, viscosity modifiers, chain extenders, spherical glass beads, organic fillers, inorganic fillers and the like.

The plasticizers can be, for example, any suitable material that softens and/or adds flexibility to the materials they are added to. The plasticizers can soften the final product increasing its flexibility. Suitable plasticizer include, for example, polyethylene glycol, sorbitol, glycerine or combination thereof.

Examples of organic fillers include wood flour, seeds, polymeric particles, ungelatinized starch granules and the like. Examples of inorganic fillers include calcium carbonate, titanium dioxide, silica, talc, mica and the like.

The biodegradable nanopolymer compositions of the present disclosure may be used for the production of various articles, such as e.g. molded articles and/or extruded articles. The term "molded article" (or "extruded article") as used in the present disclosure comprises articles made according to a molding process (or an extrusion process). A "molded article" (or "extruded article") can also be part of another object, such as e.g. an insert in a container or a knife blade or fork insert in a corresponding handle. Injection molding, profile extrusion and thermoform extrusion are processes known to a skilled person and are described for example in Modern Plastics Encyclopedia, Published by McGraw-Hill, Inc. mid-October 1991 edition.

A molded article according to the present disclosure comprises a biodegradable nanopolymer composition made from the starting materials comprising between 20 and 97%, e.g. about 91% by weight of poly(lactic acid) polymer, and between 0.5 and 65%, e.g. 5% by weight of co-polyester polymer with adipic acid, between about 0.01% and about 6% by weight of nanoparticles of a mineral material selected from the group consisting of silica, magnesium silicate and combinations thereof, and between about 0.01% and about 5% by weight of organic peroxide, each on the basis of the total weight of the biodegradable nanopolymer composition. In an embodiment, the nanoparticles of a mineral material comprise about 4% of at least 99.9%, preferably 99.99% pure finely ground silica.

According to another embodiment of the disclosure the molded article comprises a biodegradable nanopolymer composition made from the starting materials comprising about 75% by weight of poly(lactic acid) polymer, 5% by weight of co-polyester polymer with adipic acid, about 15% of mineral particles of magnesium silicate or talc, about 5% of at least 99.9%, preferably 99.99% pure finely ground silica, and between about 0.01% and about 5% by weight of organic peroxide, each on the basis of the total weight of the biodegradable nanopolymer composition. Examples for various molded article are utensils, forks, spoons, knives, chopsticks, containers and cups.

An extruded article according to the present disclosure comprises a biodegradable nanopolymer composition made from starting materials comprising between 20 and 97% by weight of poly(lactic acid) polymer, and between 0.5 and 65% by weight of co-polyester polymer with adipic acid, between about 0.01% and about 6% by weight of nanoparticles of a mineral material selected from the group consisting of silica, magnesium silicate and combinations thereof, and between about 0.01% and about 5% by weight of organic peroxide, each on the basis of the total weight of the biodegradable nanopolymer composition. In particular, a biodegradable nanopolymer composition for an extruded article according to the present disclosure can comprise between 50 and 85%, e.g. 75% by weight of poly(lactic acid) polymer, between 2 and 20%, e.g. 15% by weight of co-polyester polymer with adipic acid and about 5% of at least 99.9%, preferably 99.99% pure finely ground silica, and between about 0.01% and about 5% by weight of organic peroxide, each on the basis of the total weight of the biodegradable nanopolymer composition. Extruded articles may be for example films, trash bags, grocery bags, container sealing films, pipes, drinking straws, spun-bonded non-woven materials, and sheets.

A formulation for a profile extrusion process on the basis of a composition according to the present disclosure can comprise e.g. 75% by weight of poly(lactic acid) polymer, about 15% by weight of co-polyester polymer with adipic acid, and about 5% of at least 99.9%, preferably 99.99% pure finely ground silica, and between about 0.01% and about 5% by weight of organic peroxide each on the basis of the total weight of the biodegradable nanopolymer composition. Articles according to the present disclosure made from a profile extrusion formulation are for example drinking straws and pipes.

A formulation for a thermoform extrusion process on the basis of a composition according to the present disclosure can comprise between 75% and 85% by weight of poly(lactic acid) polymer, between 5% and 15% by weight of co-polyester polymer with adipic acid, between 5% and 15% by weight of mineral particles comprising at least one element selected from the group consisting of magnesium and silicate, preferably about 75% by weight of poly(lactic acid) polymer, about 15% by weight of co-polyester polymer with adipic acid, about 9% by weight of magnesium silicate or talc, and about 5% of at least 99.9%, preferably 99.99% pure finely ground silica, and about 5% by weight of organic peroxide. Articles according to the present disclosure made from a thermoform extrusion method are e.g. sheets for producing cups, plates and other objects that could be outside of the food service industry.

As outlined in detail before, the compositions for the preparation of such molded articles can comprise mono ester(s), and/or natural plasticizer(s) in addition to the above-mentioned components.

By way of example and not limitation, the following examples are illustrative of various embodiments of the present disclosure. The formulations below are provided for exemplification only, and they can be modified by the skilled artisan to the necessary extent, depending on the special features that are looked for.

Example 1

Injection Molding Formulations (General)

Several injection molding formulations have been using the following ingredients in proportions varying within the ranges provided here below:
 from 75% to 91% by weight poly(lactic acid) polymer
 from 2% to 5% by weight (co-polyester polymer with adipic acid)
 from 0.2% to 4% by weight of finely ground 99.99% pure silica**
 From 0.01 to 4% organic peroxide, diacetyl peroxide
 (**average size particle of about 250 nanometers)

It is important that introducing the mineral nanoparticles be performed without creating aggregates, using for instance a side-feeder that would not inject the nanoparticles directly into the barrel of the extruder but through a tower letting the nanoparticles fall and mix smoothly with the molten material.

The above-mentioned compounds are mixed by means of extrusion compounding at a temperature not to exceed 160° C. over a period ranging from 25 sec to 2 min. Then, the resulting mixture is filled in an injection molding device at a temperature of about 160° C. and is injected into a mold at a temperature of about 20° C. in order to obtain an injection molded cup.

Example 2

Injection Molding Formulation (Specific)

An injection molding formulation is prepared that comprises:
 74.5% by weight poly (lactic acid) polymer
 5% by weight (co-polyester polymer with adipic acid)
 15% by weight of magnesium silicate (talc)
 5% by weight of finely ground 99.99% pure silica**, and
 0.5% by weight of 2,5-Dimethyl-2,5-di(t-butyl peroxy) hexane
 (**average size particle of about 250 nanometers)

The injection molding formulation is prepared as detailed in Example 1 and injection molded products may be obtained according to the steps lined out in said Example 1.

Example 3

Profile Extrusion Formulation

Several profile extrusion formulations have been using the following ingredients in proportions varying within the ranges provided here below:
 from 65% to 75% by weight poly lactic acid polymer
 from 15% to 20% by weight of co-polyester polymer with adipic acid
 from 1% to 5% by weight finely ground 9.99% pure silica**
 From 0.5% to 2% by weight of 2,5-Dimethyl-2,5-di(t-butyl peroxy) hexane
 (**average size particle of about 250 nanometers)

The above-mentioned compounds are mixed by twin screw compounding. The resulting mixture is filled in a profile extrusion device at a temperature not to exceed 160° C. and a tube is obtained which may be used as a drinking straw.

Example 4

Thermoform Extrusion Formulation

Several thermo form extrusion formulations have been using the following ingredients in proportions varying within the ranges provided here below:

from 55% to 75% by weight poly lactic acid polymer from 5% to 15% by weight of co-polyester polymer with adipic acid from 4% to 9% by weight of magnesium silicate (talc)

from 1% to 5% by weight finely ground 99.99% pure silica** from 0.2% to 1% by weight of 2,5-Dimethyl-2,5-di(t-butyl peroxy) hexane (**average size particle of about 250 nanometers)

The above-mentioned compounds are mixed by twin screw compounding. The resulting mixture is filled in a thermoform extrusion device at a temperature not to exceed 160° C. and a sheet having a thickness between 0.1 mm to 45 mm is obtained which may be used for forming cups, plates or bottles.

Example 5

The following blend composition was prepared in a twin crew extruder and at temperatures not exceeding 160° C. The product was tested for heat deflection temperature (HDT) (at 66 psi per ASTM test method D648) and Vicat softening temperature (by ASTM D1525-07 test method).

PLA: 75%
3% Co-polyester polymer with adipic acid
$CaSO_4$: 22%
HDT @ 66 psi: 86.1 C
Vicat softening point: 124.7 C
Control Sample:
PLA: 75%
3% copolyester polymer with adipic acid
Magnesium silicate (Talc): 22%
HDT @ 66 psi: 52.3
Vicat softening point: 62.1° C.

It was surprisingly found that addition of calcium sulfate would improve the HDT and Vicat softening point of these novel formulations. This is also observed in formulations that do not contain the nanoparticles and the organic peroxide additive. It is anticipated that this will also be the case when the nanoparticle additive and organic peroxide is present.

Example 6

Biodegradable Nanopolymer Composition

PLA: 78%
Adipic acid based copolyester 5%
Magnesium silicate 5%
Organically coated calcium carbonate 12% (EM force Bio grade from Specialty Minerals)

When compounded in a twin screw extruder and tested for impact strength, the biodegradable nanopolymer composition was found to have at least twice the impact strength of a corresponding formulation (with 17% magnesium silicate) without the addition of the organically coated calcium carbonate.

Example 7

Biodegradable Nanopolymer Composition

PLA: 84%
Caprolactone: 15%
Oligomeric chain extender (JONCRYL® Conc*): 0.75%
Polymer processing aid (STEPHAN® 2000 DS): 0.25%
(*JONCRYL® ADR-4368/CAPA® 6800 30%/70% from BASF)

The above composition was blended in a twin screw extruder at 170° F. and pelletized. The compounded resin was successfully used in extrusion coating process on paper products.

Control Sample
PLA: 84%
Caprolactone: 15%
Polymer processing aid (STEPHAN® 2000 DS): 0.25%

The control compounded resin failed to perform in the extrusion coating process on paper products (e.g. it has a very low viscosity).

Example 8

PLA: 84%
Copolyester with adipic acid: 15%
Oligomeric chain extender (Arkema Biostrength™ 700 or JONCRYL®Conc*): 0.75%
Polymer processing aid (STEPHAN® 2000 DS): 0.25%
(*JONCRYL® ADR-4368/CAPA® 6800 30%/70% from BASF)

The product performed well in extrusion coating applications (e.g. it has a higher viscosity than the control example in Example 7).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A composition made from starting materials comprising:
between 20% and 97% by weight of poly(lactic acid) polymer (PLA) on the basis of the total weight of the polymer composition;
between 0.5% and 65% by weight of a co-polyester polymer with adipic acid on the basis of the total weight of the polymer composition; and
between 0.01% and 6% by weight of nanoparticles of a mineral material on the basis of the total weight of the polymer composition, the mineral material being selected from the group consisting of silica, nanoclays of the vermiculite family, and combinations thereof, wherein the nanoparticles have a size ranging between 20 and 500 nanometers, and wherein the nanoparticles of the mineral material have a degree of purity of at least 99.9%.

2. The composition of claim 1, wherein the degree of purity is at least 99.99%.

3. The composition of claim 1 further comprising an oligomeric chain extender.

4. The composition of claim 3, wherein the oligomeric chain extender is selected from the group consisting of styrene-acrylic copolymers, oligomers containing glycidyl groups incorporated as side chains, and combinations thereof.

5. The composition of claim 1, further comprising an organic peroxide.

6. The composition of claim 5, wherein the organic peroxide is selected from the group consisting of diacetyl peroxide, cumyl-hydro-peroxide, dibenzoyl peroxide, dialkyl peroxide, 2,5-methyl-2,5-di(terbutylperoxy)-hexane, and combinations thereof.

* * * * *